United States Patent
Bakke et al.

(10) Patent No.: US 7,493,370 B2
(45) Date of Patent: Feb. 17, 2009

(54) TWO STAGE METHOD FOR DYNAMICALLY DETERMINING PRIMARY ADAPTER IN A HETEROGENEOUS N-WAY ADAPTER CONFIGURATION

(75) Inventors: Brian Eric Bakke, Rochester, MN (US); Robert Edward Galbraith, Rochester, MN (US); Brian James King, Rochester, MN (US); Timothy James Larson, LaCrosse, WI (US); William Joseph Maitland, Jr., Rochester, MN (US); Timothy Jerry Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 10/977,774

(22) Filed: Oct. 29, 2004

(65) Prior Publication Data
US 2006/0112032 A1   May 25, 2006

(51) Int. Cl.
G06F 15/13   (2006.01)

(52) U.S. Cl. .............. 709/208; 709/200; 709/209; 710/8; 710/9; 710/10; 703/24; 703/25

(58) Field of Classification Search ............ 709/200, 709/208, 209; 710/8, 9, 10; 703/24, 25
See application file for complete search history.

(56) References Cited

U.S. PATENT DOCUMENTS

| 5,768,623 A | * | 6/1998 | Judd et al. | 710/37 |
| 6,601,187 B1 | * | 7/2003 | Sicola et al. | 714/6 |
| 6,658,018 B1 | * | 12/2003 | Tran et al. | 370/465 |

* cited by examiner

*Primary Examiner*—Jinsong Hu
(74) *Attorney, Agent, or Firm*—Joan Pennington

(57) ABSTRACT

A method and apparatus are provided for dynamically determining a primary adapter in a heterogeneous N-way adapter configuration. Each of the adapters generates information about itself and exchanges the information with all other adapters. First a decision-making adapter is identified. Then the decision-making adapter compares the adapter-generated information of all the adapters and makes a decision determining the primary adapter. The decision-making adapter communicates the decision to all other adapters. The determined primary adapter assumes a role as the primary adapter and the other adapters assume a role as a secondary adapter.

11 Claims, 3 Drawing Sheets

TWO STAGE METHOD FOR DYNAMICALLY DETERMINING PRIMARY ADAPTER IN A HETEROGENEOUS N-WAY ADAPTER CONFIGURATION

FIELD OF THE INVENTION

The present invention relates generally to the data processing field, and more particularly, relates to a method and apparatus for dynamically determining a primary adapter in a heterogeneous N-way adapter configuration.

DESCRIPTION OF THE RELATED ART

A need exists for an effective mechanism for making an optimum determination of which adapter should be the primary adapter. This problem is further complicated when the adapters do not have identical capabilities or features.

Prior solutions have typically avoided the worst aspects of the problem by requiring the adapters to have like features and matched implementations. Both adapters then perform an identical decision making process so that they come to the same conclusion with respect to which adapter is primary and which is secondary.

The prior art solution makes it very difficult to make changes, for example, either to add features or fix design flaws, because the adapters always are required to be in synchronization.

BRIEF SUMMARY OF THE INVENTION

A principal aspect of the present invention is to provide a method and apparatus for dynamically determining a primary adapter in a heterogeneous N-way adapter configuration. Other important aspects of the present invention are to provide such method and apparatus for dynamically determining a primary adapter in a heterogeneous N-way adapter configuration substantially without negative effect and that overcome many of the disadvantages of prior art arrangements.

In brief, a method and apparatus are provided for dynamically determining a primary adapter in a heterogeneous N-way adapter configuration. Each of the adapters generates information about itself and exchanges the information with all other adapters. First a decision-making adapter is identified. Then the decision-making adapter compares the adapter-generated information of all the adapters and makes a decision determining the primary adapter. The decision-making adapter communicates the decision to all other adapters. The determined primary adapter assumes a role as the primary adapter and the other adapters assume a role as a secondary adapter.

In accordance with features of the invention, the adapter-generated information includes vital product data (VPD), a scalar value, and a prior adapter role. The decision-making adapter is identified based upon vital product data (VPD) for each of the adapters.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
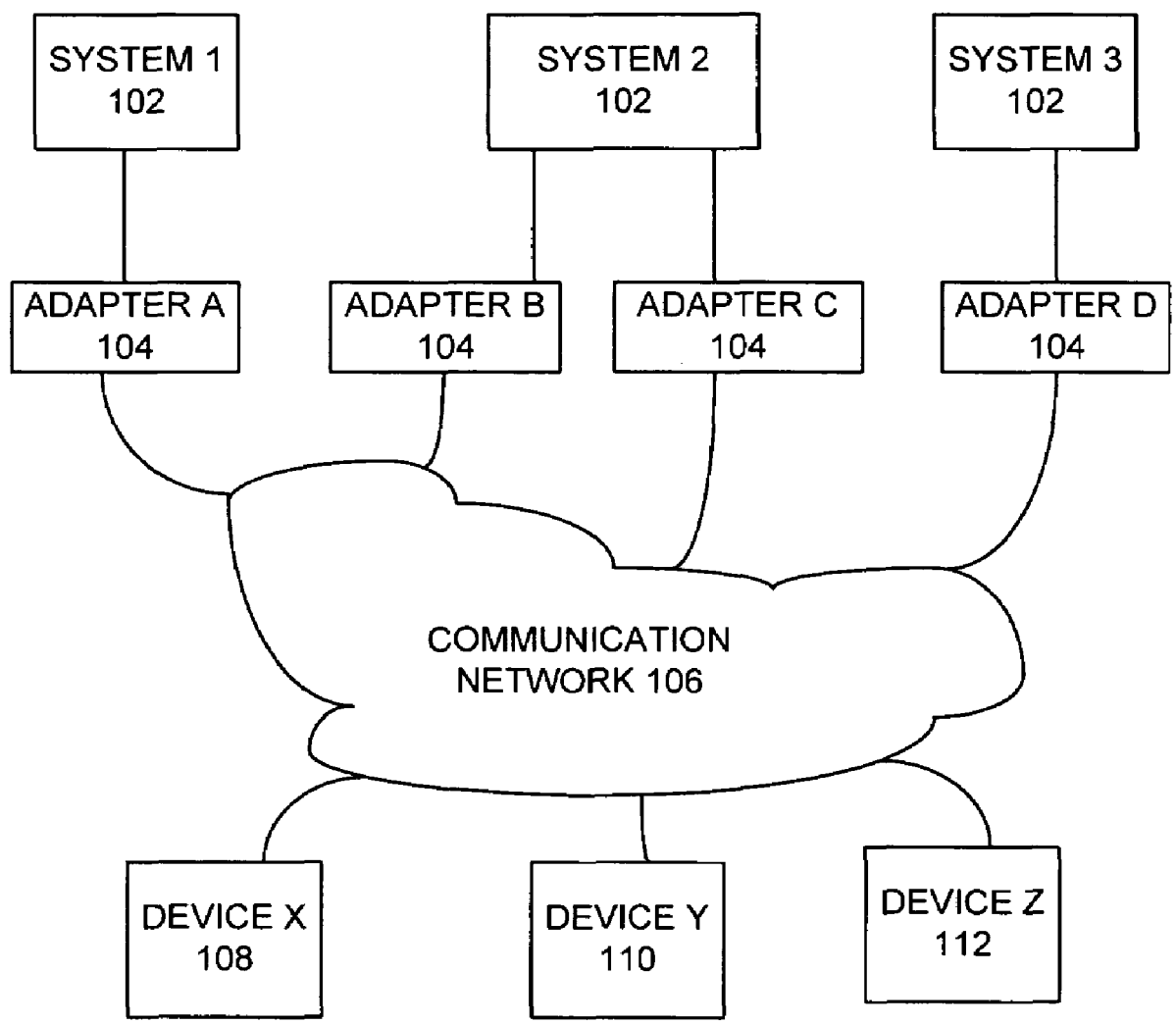
FIG. 1 is a block diagram of an exemplary system for implementing methods for dynamically determining a primary adapter in a heterogeneous N-way adapter configuration in accordance with the preferred embodiment.

Referring now to the drawings, in FIG. 1 there is shown an exemplary multiple adapter system generally designated by the reference character 100 for implementing methods for dynamically determining a primary adapter in a heterogeneous N-way adapter configuration in accordance with the preferred embodiment. System 100 includes a plurality of host computer systems 1-3, 102. Each of the host computer systems 1-3, 102 includes one or more adapters A, B, C, D, 104. Each of the adapters A, B, C, D, 104 is coupled to a communication network 106. System 100 includes a plurality of devices X, Y, Z, 108 connected to the communication network 106. Each of the adapters A, B, C, D, 104 is capable of reaching all of the devices X, Y, Z, 108.

It should be understood that the present invention is not limited to the illustrated system 100, the present invention can be used with various implementations. For example, a simpler example system configuration would include two host computer systems 1-2, 102, each with a single adapter 104 attached, and the communication network 106 being a parallel SCSI bus or a serial attached SCSI (SAS) domain.

It should be understood that the present invention applies to I/O adapters 104 connected in the following type of high availability (HA) configuration. Both adapters 104 are connected to the same set of disk drives. Both adapters 104 support and use RAID, such as RAID-5, RAID-6, and/or RAID-10, to form RAID arrays. One adapter 104, at any point in time, is designated to be the primary adapter, for example, adapter B, 104. Then other adapters A, C, D, 104 are designed to be secondary adapters. Primary and secondary adapters 104 can and do exist in different host systems 102, or logical partitions of a system. Both primary and secondary adapters 104 show the same RAID arrays to their host systems. The primary adapter 104 actually controls the RAID arrays and associated disks. The secondary adapters 104 forward commands, such as Reads and Writes, to the primary adapter for processing. If a primary adapter 104 fails or is powered off, then a secondary adapter 104 takes over the role of primary adapter.

In accordance with features of the preferred embodiment, two core aspects of the invention lead to advantages achieved. The first aspect is a two step decision making process. This breaks the determination of which adapter A, B, C, D, 104 is to be primary and which is to be secondary into two phases. In the first phase the adapters A, B, C, D, 104 exchange information and identify an adapter which will be responsible for making the decision. In the second phase, the identified adapter in phase one uses the information exchanged to determine which adapter A, B, C, D, 104 will become primary and the other adapters will become secondary. This decision is then communicated to the other adapters. Note that the decision is made wholly by a single adapter 104, and must be adhered to by the other adapters even if another adapter might not have made the same decision.

Figure 3:
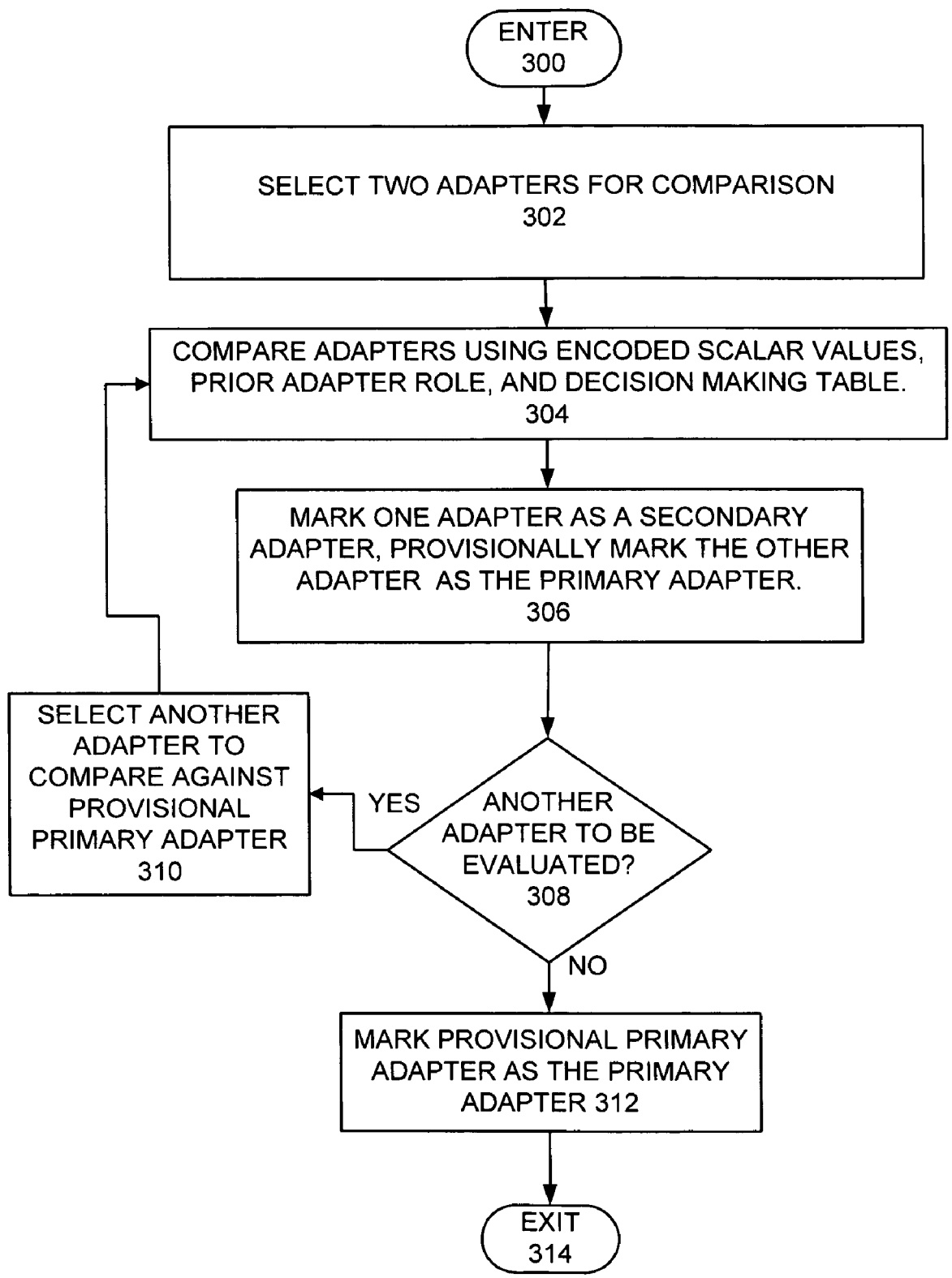
FIG. 3 is a flow chart illustrating exemplary steps of a decision algorithm routine of the overall flow chart of FIG. 2 in accordance with the preferred embodiment.

The second aspect is that one of the key pieces of data exchanged by the adapters A, B, C, D, 104 is an encoded value which quantitatively denotes how much that adapter desires to become the primary adapter. The adapter that makes the primary adapter decision, compares the values computed for itself and received from each the other adapters. Based upon the compared values, the adapter then makes a decision as to which adapter is to become the primary adapter and communicates the decision to the other adapters. In accordance with features of the preferred embodiment, each adapter has a common understanding of how to compare the other adapter's value against its own, but each adapter may have different algorithms to determine the setting of the value. The comparison process is described further below and is illustrated and described with respect to FIG. 3.

In accordance with features of the preferred embodiments, heterogeneous adapters 104 are supported. One example of a heterogeneous adapter configuration is that a generation-one adapter is allowed to mate with a generation-two adapter even though the generation-two adapter may support functions not understood by the generation-one adapter. The generation-one adapter still is capable of making the proper decision even though the generation-one adapter does not understand the generation-two features because the decision is based on the exchange of encoded values generated by each adapter. This provides significant benefits to the customer and vendor because it allows significantly greater configuration options and allows the vendor to reduce the number of parts held in field stock as replacements because a single part can serve as a replacement for many different adapters.

In accordance with features of the preferred embodiments, only one adapter 104 makes the decision, so the decision algorithms between a pair of adapters are allowed to be different. This is an advantage, for example, if an improved algorithm is discovered because the algorithm may be implemented immediately without requiring a guarantee for all adapters to be updated. This is true for both the determination of the encoded values and for the algorithm used by the decision making adapter to compare those values.

In accordance with features of the preferred embodiments, the primary adapter 104 may be changed, for example, upon late arrival of the second adapter when the benefits of the change are sufficient to overcome the momentary disruption involved in making the change. This is tunable based on the potential benefits gained in availability of performance. For example, the second adapter 104 may contain hardware acceleration of some feature that is implemented in firmware by the first adapter, and the system would achieve significant performance benefits by changing the primary adapter to be the second adapter. An old adapter that does not understand the functions/features provided by the new adapter, for example, is unaware of the possibility of hardware acceleration, is still able to make the optimum determination if the old adapter is elected to make the decision because of how the new adapter encoded the value of its characteristics in the information exchanged between adapters.

In accordance with features of the preferred embodiments, this solution for dynamically determining a primary adapter is amenable to loosely coupled configurations, for example, in location and power domains, where system packaging cannot be used to aid in decision making process; as opposed to a system where one might otherwise be able to use location information, for instance, to help determine which adapter will become the primary adapter.

In accordance with features of the preferred embodiments, this solution for dynamically determining a primary adapter readily extends from configurations containing two adapters into configurations containing N adapters.

In accordance with features of the preferred embodiments, a sequence of actions is provided which the adapters 104 take to determine which adapter is primary and which is secondary. This sequence is repeated each time a new adapter joins the configuration or if the adapter currently serving as the primary adapter leaves the configuration. Each of the steps is illustrated and described with respect to FIG. 2.

Figure 2:
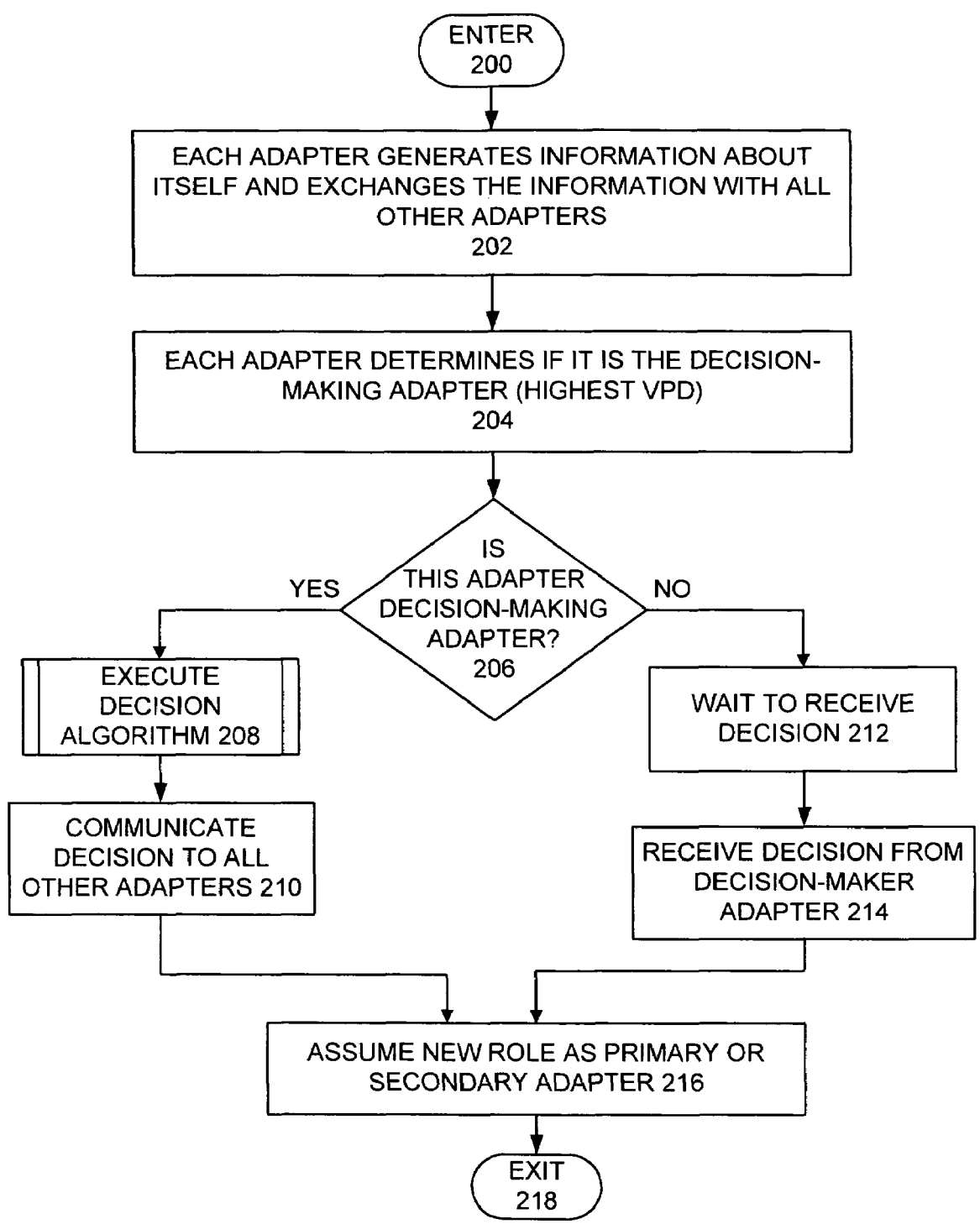
FIG. 2 is a flow chart illustrating exemplary sequential operations for dynamically determining a primary adapter in a heterogeneous N-way adapter configuration in accordance with the preferred embodiment.

Referring now to FIG. 2, there are shown exemplary sequential operations for dynamically determining a primary adapter in a heterogeneous N-way adapter configuration in accordance with the preferred embodiment starting at a block 200. The exemplary steps are:

a. Calculation and exchange of information between adapters 104. Each adapter 104 generates information about itself and exchanges the information with all other adapters as indicated in a block 202.

b. Determination of which adapter will make the decision on the assignment of primary/secondary adapter roles. Each adapter 104 determines if it is the decision-making adapter as indicated in a block 204 and is identified as indicated in a decision block 206.

c. Adapter 104 elected in prior step looks at information exchanged, and makes decision of which adapter will become the primary adapter. The decision-making adapter identified at decision block 206, executes a decision algorithm routine as indicated in a block 208.

d. Adapter which made the decision communicates it to the other adapters. Responsive to executing the decision algorithm routine at block 208, the decision-making adapter communicates the decision to all other adapters as indicated in a block 210. The other adapters wait to receive the decision as indicated in a block 212 and receive the decision from the decision-making adapter as indicated in a block 214.

e. The adapter assumes their new roles. As indicated in a block 216, the adapters 104 assume new role as primary or secondary adapter. This completes the sequential steps as indicated in a block 218.

Step a. Calculation and Exchange of Information Between Adapters.

Each adapter 104 independently generates a set of information about itself and communicates it to the other adapters at block 202. The set of adapters present can be determined, for instance, by a sweep of the network fabric 106.

One type of information included is vital product data (VPD) and primary or secondary adapter state. The VPD includes items such as the model number of the adapter, the serial number of the adapter, and the current level of the firmware executing on the adapter. The primary or secondary adapter state communicates whether or not this adapter is currently the primary adapter, currently a secondary adapter, or currently acting as a standalone adapter where it has not previously seen another adapter to mate with since being last reset. This type of information is communicated between the adapters in a fixed format, and the format remains fixed over time.

The second type of information is a set of self-defining information fields that communicate characteristics of the adapters 104. This is a variable length list which each adapter can walk to determine additional characteristics of the other adapters. These characteristics might include things such as the amount of memory on the adapter 104, the performance level of the adapter, presence or absence of hardware acceleration, and support for optional features. The contents of this information will vary over time. This is acceptable since this information is not required to be used to decide which adapter 104 will make the primary/secondary decision, and is not required to be used to actually make the primary/secondary decision. Instead this information is informational only.

The third type of information is an encoded scalar value that indicates the relative desire of this adapter 104 to become the primary adapter. A higher value indicates a greater desire to become the primary adapter. A lower value indicates a lesser desire, or a desire not to become the primary adapter. Several considerations are taken into account when determining this value. One is the current and previous states of the adapter 104, for example, whether or not the adapter is the primary adapter. Another is the feature level of the adapter where greater capabilities, such as larger amounts of memory, hardware acceleration of some features, or a more recent firmware level leads to a greater value. A third might be the presence or absence of nonvolatile data such as cache data or parity update footprints for the RAID arrays. A fourth could be related to availability aspects such that an adapter that is experiencing a fault such that it is not able to see some of the devices could present a lower non-optimum functionality. A fifth could indicate whether or not the host system 102 has expressed a desire for this adapter 104 to be the primary adapter is possible as it might desire to simplify configuration management. All of these items are weighted according to this adapter's policy and combined into the scalar value indicating the relative desire of this adapter 104 to become the primary adapter. The two or more adapters 104 need not have the same policy for calculating the scalar value which allows for changes and enhancements to be made over time without requiring changes to existing adapters; however, the adapters 104 do need to share some general level of understanding on the meaning of the value.

An example implementation for computing the scalar value follows. The scalar is a 32 bit value with a Default value of 0x000000FF and a Change value of 0x00FFFFFF (the significance of default and change are elaborated upon in step c). The steps in computing the value are:

1. Initialize scalar to Default value.
2. OR in (via bitwise OR operation, resulting in a higher scalar value) the following positive attributes:

If the adapter has a condition for which it temporarily desires to be the primary adapter such as an knowledge that it has better than average connectivity to the devices present given the known system failures, then OR with 0x08000000.

If the adapter has been directed by the host system to be the primary adapter, then OR with 0x01000000.

If the adapter was previously declared a primary adapter during the last execution of the decision algorithm, then OR with 0x000040000.

3. AND out (via a bitwise AND operation, resulting in a lower scalar value) the following negative attributes:

If the adapter requires cache data for some devices present, then AND with 0x00000020.

If the adapter does not support an attribute (for example, a given RAID level) for some devices present, then AND with 0x00000010.

If some of the devices present require footprints for in process RAID updates, then AND with 0x00000008.

Step b. Determination of Which Adapter will Make the Decision on the Assignment of Primary/Secondary Adapter Roles.

The determination of which adapter 104 will make the decision at block 204 is based solely upon the VPD contained in the information exchanged between the multiple N adapters. This determination can be as simple as a comparison of the model/serial numbers to elect the adapter 104 with the highest number. This determination is very simple and remains fixed over time; that is, all new adapters will also follow the same determination. The purpose of this determination is to elect a single adapter 104 to make the decision of which adapter will become primary and which adapters will become secondary. By guaranteeing only a single adapter 104 makes the decision, which is adhered to by all adapters, then the decision-making algorithm is allowed to change over time. For example, a change to an improved decision-making algorithm can correct flaws in the original algorithm or include additional features to a new adapter type that changes the preferred decision.

Step c. Decision-Making Adapter Looks at Information Exchanged, and Makes Decision of Which Adapter will Become the Primary Adapter.

In the decision algorithm executed at block 208 of FIG. 2 to determine which adapter 104 will be the primary adapter, there are two conflicting issues for the decision. The first issue is the desire to minimize disruption, so that the host systems 102 will not unnecessarily be impacted by a change of which adapter 104 is primary. The second issue is the desire to end with the best possible configuration with respect to availability, performance, and maintenance concerns. The data used to make the decision includes the current adapter states and the respective scalar values generated by each of the adapters 104. In the decision-making process, the scalar values are compared against two values, a Change value, and a Default value. An adapter 104 generating a value higher than the Change value is indicating that this adapter should become the primary adapter even at the expense of a momentary disruption during the configuration change. An adapter 104 generating a value lower than the Default value is indicating that this adapter should not become the primary adapter Referring also to FIG. 3, there are exemplary steps of the decision algorithm executed at block 208 of FIG. 2 starting at a block 300. Two adapters 104 are selected for comparison as indicated in a block 302. The selected adapters 104 are compared using the scalar values, prior adapter role, and a decision-making table as indicated in a block 304. One adapter is marked as a secondary adapter and the other adapter is provisionally marked as the primary adapter as indicated in a block 306. Checking for another adapter to be evaluated is performed as indicated in a decision block 308. If so, then another adapter is selected for comparison with the current provisional primary adapter as indicated in a block 310. Then the adapter are compared using the scalar values, prior adapter role, and a decision-making table at block 304. When there is no further adapter to be evaluated, then the current provisional primary adapter is marked as the primary adapter as indicated in a block 312. This completes the sequential steps as indicated in a block 314.

The following TABLE 1 describes an exemplary decision tree that determines which adapter is primary based upon these factors. Since only a single adapter 104 executes this algorithm, the algorithm can be changed as needed without impacting existing adapters. The treatment of an adapter currently acting as a secondary adapter follows the treatment of a standalone adapter in table 1.

TABLE 1

| | | Decision Factors | | | Decision | |
|---|---|---|---|---|---|---|
| | | Scalar | Scalar | Greater | | |
| State of Adapter A | State of Adapter B | value of Adapter A | value of Adapter B | scaler value | Primary Adapter | Secondary Adapter |
| Primary | Standalone | Any | Any | A | A | B |
| Primary | Standalone | Any | Any | A = B | A | B |
| Primary | Standalone | Any | Exceeds Change | B | B | A |
| Primary | Standalone | Exceeds or equal to Default, Less than or equal to Change | Less than or equal to Change | B | A | B |
| Primary | Standalone | Less than Default | Less than or equal to Change, Exceeds or equal to Default | B | B | A |
| Primary | Standalone | Less than Default | Less than Default | B | A | B |
| Standalone | Primary | Any | Any | B | B | A |
| Standalone | Primary | Any | Any | A = B | B | A |
| Standalone | Primary | Exceeds Change | Any | A | A | B |
| Standalone | Primary | Less than or equal to Change | Exceeds Default, less than or equal to Change | A | B | A |
| Standalone | Primary | Less than or equal to Change, Exceeds or equal to Default | Less than Default | A | A | B |
| Standalone | Primary | Less than Default | Less than Default | A | B | A |
| Standalone | Standalone | Any | Any | A | A | B |
| Standalone | Standalone | Any | Any | A = B | A | B |
| Standalone | Standalone | Any | Any | B | B | A |
| Primary | Primary | Any | Any | A | A | B |
| Primary | Primary | Any | Any | A = B | A | B |
| Primary | Primary | Any | Any | B | B | A |

Step d. Adapters Which Made the Decision to Communicates it to the Other Adapter.

The decision is communicated to the other adapters at block 210 of FIG. 2.

Step e. The Adapters Assume Their New Roles.

Each adapter 104 now assumes its new role as primary or secondary adapter at block 216 of FIG. 2. This might require one of the adapters 104 to relinquish a role as a primary adapter and become the secondary adapter. All adapters are required to comply with decision received even if they may disagree with it. This is a key point which allows the decision making process to change over time. If the adapters independently made the decision then they must be guaranteed to always come to the same conclusion. This effectively precludes the ability to add new features or to change the decision making algorithm if an improved algorithm is discovered because of the existence of other adapters which would not contain the new algorithm or understand how to treat the new features.

While the present invention has been described with reference to the details of the embodiments of the invention shown in the drawing, these details are not intended to limit the scope of the invention as claimed in the appended claims.

What is claimed is:

1. A method for dynamically determining a primary adapter in a heterogeneous adapter configuration of a plurality of adapters comprising the steps of:

each of the adapters generating information about itself including providing vital product data (VPD); said VPD including a predefined model number of the adapter and a current level of the firmware executing on the adapter; and generating a scalar value, said scalar value indicating a capability of the adapter; each of the adapters exchanging the adapter-generated information including said VPD with all other adapters and each of the adapters utilizing the exchanged information including said VPD and identifying a decision-making adapter of the plurality of adapters;

said identified decision-making adapter comparing the adapter-generated information of each the adapters and making a decision determining the primary adapter;

said identified decision-making adapter notifying all other adapters of said determined primary adapter; and said determined primary adapter assuming a role as the primary adapter and the other adapters assuming a role as a secondary adapter.

2. A method for dynamically determining a primary adapter as recited in claim 1 includes the step of providing a prior adapter role.

3. A method for dynamically determining a primary adapter as recited in claim 1 wherein the step of identifying a decision-making adapter includes each of the adapters comparing vital product data (VPD) of all of the adapters.

4. A method for dynamically determining a primary adapter as recited in claim 3 includes the step of identifying a highest VPD for the adapters to determine the decision-making adapter.

5. A method for dynamically determining a primary adapter as recited in claim 1 wherein the steps of said decision-making adapter comparing the adapter-generated information of each the adapters and making a decision determining the primary adapter includes the steps of said decision-making adapter comparing an encoded scalar value of each the adapters.

6. A method for dynamically determining a primary adapter as recited in claim 5 wherein the steps of comparing an encoded scalar value of each the adapters includes the steps of comparing said encoded scalar value of each the adapters with a default value and a change value.

7. A method for dynamically determining a primary adapter as recited in claim 6 wherein the steps of comparing said encoded scalar value of each the adapters with a default value includes the steps of identifying said encoded scalar value greater than said default value and indicating a positive factor for selecting the adapter as the primary adapter.

8. A method for dynamically determining a primary adapter as recited in claim 6 wherein the steps of comparing said encoded scalar value of each the adapters with a change value includes the steps of identifying said encoded scalar value less than said change value and indicating a negative factor for selecting the adapter as the primary adapter.

9. A method for dynamically determining a primary adapter as recited in claim 6 includes the steps of responsive to comparing said encoded scalar value of each the adapters with said encoded scalar value of the other adapters, identifying a compared higher value indicating a positive factor for selecting the adapter as the primary adapter.

10. A method for dynamically determining a primary adapter as recited in claim 1 wherein the steps of said decision-making adapter comparing the adapter-generated information of each the adapters and making a decision determining the primary adapter includes the steps of said decision-making adapter comparing a prior adapter role of the primary adapter or a secondary adapter.

11. A method for dynamically determining a primary adapter as recited in claim 10 includes the steps of identifying said prior adapter role of the primary adapter and indicating a positive factor for selecting the adapter as the primary adapter.

* * * * *